United States Patent
Gerstel (10) Patent No.: US 7,924,875 B2
(45) Date of Patent: Apr. 12, 2011

(54) VARIABLE PRIORITY OF NETWORK CONNECTIONS FOR PREEMPTIVE PROTECTION

(75) Inventor: Ornan Gerstel, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 969 days.

(21) Appl. No.: 11/428,627

(22) Filed: Jul. 5, 2006

(65) Prior Publication Data

US 2008/0008085 A1 Jan. 10, 2008

(51) Int. Cl.
*H04J 3/16* (2006.01)
(52) U.S. Cl. ............... 370/468; 370/252; 370/395.2; 709/224; 709/226; 714/4
(58) Field of Classification Search .......... 370/216–225, 370/230, 235, 241–251, 252, 395.2, 395.21, 370/433, 468; 709/239, 240, 218–219, 223–229, 709/235; 714/1–5, 25, 39, 46–48; 702/182–186
See application file for complete search history.

(56) References Cited

U.S. PATENT DOCUMENTS

| | | | | |
|---|---|---|---|---|
| 6,725,401 B1 * | 4/2004 | Lindhorst-Ko | ................ | 714/47 |
| 6,747,957 B1 * | 6/2004 | Pithawala et al. | ............. | 370/252 |
| 7,082,463 B1 * | 7/2006 | Bradley et al. | ................ | 709/223 |
| 7,328,265 B2 * | 2/2008 | Anstey et al. | ................ | 709/226 |
| 2003/0093244 A1 * | 5/2003 | Corlett et al. | ................ | 702/186 |
| 2003/0135609 A1 * | 7/2003 | Carlson et al. | ................ | 709/224 |
| 2004/0218582 A1 | 11/2004 | Kennedy et al. | | |
| 2005/0160171 A1 * | 7/2005 | Rabie et al. | .................. | 709/227 |
| 2005/0228878 A1 * | 10/2005 | Anstey et al. | ................ | 709/224 |
| 2007/0233865 A1 * | 10/2007 | Garbow et al. | ............... | 709/226 |

* cited by examiner

*Primary Examiner* — Aung S Moe
*Assistant Examiner* — Habte Mered (57) ABSTRACT

Even though network connections have priorities for reconnection and preemption of other connections upon a failure, these priorities are fixed based on the Service Level Agreement (SLA) between the Service Provider and the customer, and do not depend on the actual outage time, or downtime, during the operation of the network. Only a fixed pecking order for reconnection is guaranteed. Therefore they cannot ensure the outage a connection which experiences downtimes limited to the SLA. With the present invention, the priorities of the network connections are determined responsive to the failures of the network connections. The priorities of the network connections can also be determined responsive to the permitted downtime of the connections to better meet the SLA of the connection. Another factor in varying a network connection priority can be the expected downtime of a connection.

18 Claims, 5 Drawing Sheets

Fig. 1A

| Traffic Class | Allowed Outage per year | Percentage of Overall Traffic |
|---|---|---|
| A | 0 hours | 25% |
| B | 1 hour | 25% |
| C | 2 hours | 25% |
| D | 3 hours | 25% |

VARIABLE PRIORITY OF NETWORK CONNECTIONS FOR PREEMPTIVE PROTECTION

BACKGROUND OF THE INVENTION

The present invention is related to techniques of protecting traffic on electronic and optical networks.

When a link of an electrical or optical network is broken, the traffic capacity between the two nodes of the broken link is necessarily reduced until the link is restored. Various protection techniques are used to ensure that the network connections using the link are nonetheless maintained. This is done by rerouting the signals around the broken network link, which can be performed by various protection techniques. The protection techniques rank the network connections using the link by a priority.

To the user of a network connection, the level of protection afforded to a network connection is typically defined by a Service Level Agreement (SLA) with a network Service Provider (SP), essentially the network administrator. The SLA guarantees that a network connection will have no more than a stated amount of downtime, time during which network connection is lost. The SP uses the protection priority to guarantee the desired level of protection to the user of a connection. However, the resulting service protection techniques only support one kind of guaranteed protection level: full protection with almost no downtime (termed 99.999% availability). This is true for connection-oriented technologies, such as SONET/SDH (Synchronous Optical NETwork/Synchronous Digital Hierarchy), and as well as packet flow technologies, such as MPLS (MultiProtocol Label Switching), RPR (Resilient Packet Ring), etc. Hence it should be understood that network connections as used herein includes not only circuit connections but also packet flows.

The various protection techniques theoretically allow different levels of priority so that network users with higher priority preempt users with lower priority to ensure their network connections are maintained. However, the priority levels are fixed and network connections with higher priorities simply maintain their preemption of network connections with lower priorities to ensure a "pecking order" of connectivity. The downtime of a network connection depends only on the other connections that compete with it and not on the allowed downtime of its SLA. These techniques do not necessarily ensure that the connection's downtime does not exceed its allowed downtime if the priority of the connection is not at the highest level.

Thus current protection techniques do not guarantee a network connection a level of protection below full protection. There is no way to reduce the amount of protection bandwidth and at the same time provide meaningful protection assurance for all of the connections impacted by a network failure based on each connection's SLA.

DETAILED DESCRIPTION OF THE INVENTION

Figure 1A:
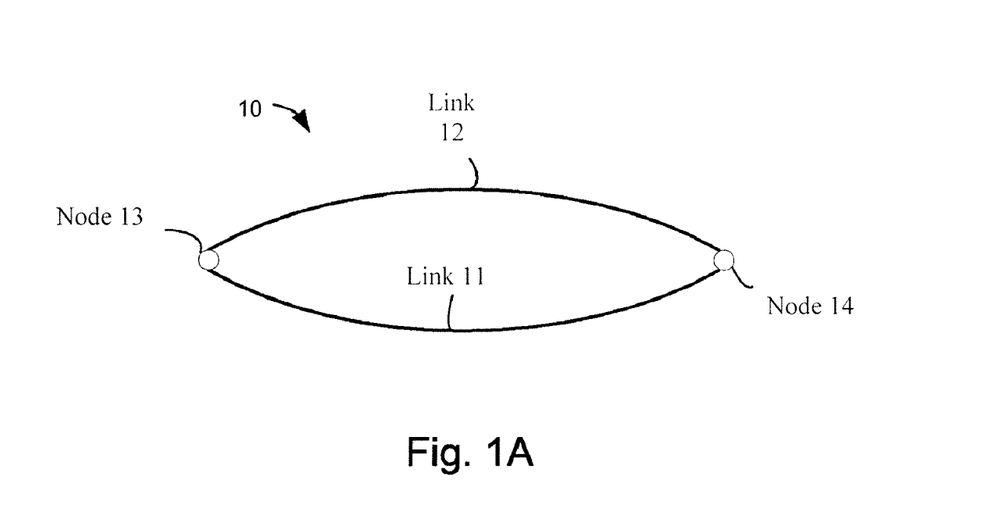
FIG. 1A illustrates a simplified communications network with only two nodes.
Figure 1B:
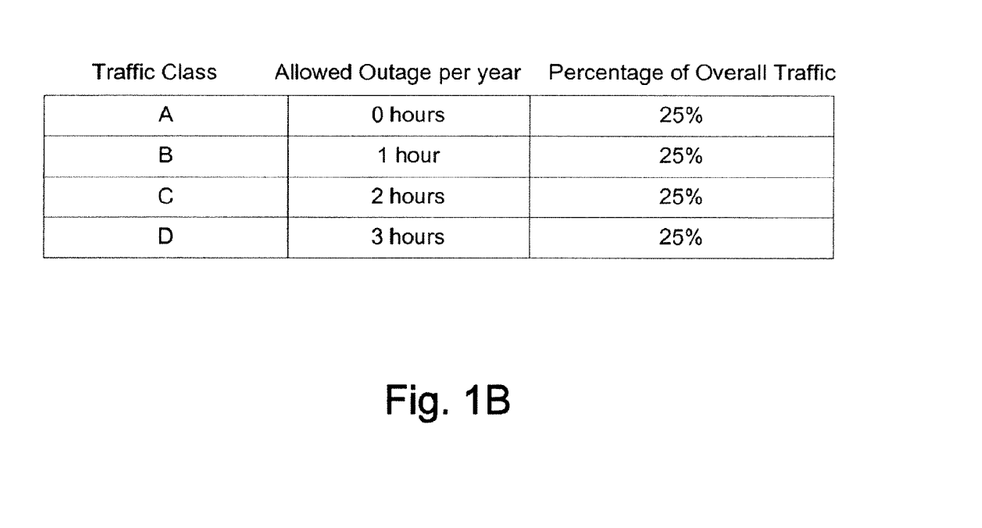
FIG. 1B is a table of connections of the FIG. 1A network with SLA requirements.

An example illustrates the problem of the present use of priority in re-establishing network connections in communications networks. In an exemplary and simplified two-node network 10 shown in FIG. 1A, there are two links 11 and 12 between nodes 13 and 14. The network has network connections with traffic classes A, B, C and D which define the allowed downtime, the permitted amount of outage, set forth in the network connection SLAs. The downtime of each class is shown in the table in FIG. 1B Assuming that the actual downtime from failures on both links 11 and 12 amount to 3 hours a year and that no protection bandwidth exists in the network 10, traffic protection for network connections of one class must preempt the traffic of the other network connections of other classes. Under existing preemption designs, the traffic of connection classes A and B have higher priority than that of connection classes C and D and preempt that traffic. As a result, the class A and B connections have zero downtime, while class C and D connections are down for 3 hours. This is true no matter how the traffic is routed. As a result, the SLAs for class C connections are violated.

Rather than being fixed, the priorities of different network connections are determined in response to link failures and resulting downtimes of the network connections in accordance with the present invention. The varying priorities can ensure that the SLA of each connection is not violated or at least is violated in a minimal fashion. With respect to the exemplary network 10 of FIGS. 1A and 1B, one embodiment of the present invention preempts the traffic of the class C connections for 2 hours. Once downtime approaches the allowed downtime (defined by the SLA of each connection), the priority of the class C connections rises above that of the class B connections. Therefore, the class B traffic is preempted for the remaining hour, and the SLAs of all the connections are satisfied.

It should be noted that the present invention is independent of the various protection protocols used in communications networks. Thus the present invention is not particularly concerned how a particular network preempts circuit connections or packet flows, such as RSVP (Resource Reservation Protocol) requests or SONET APS (Automatic Protection Switching), or IP packet preemption. Rather, the present invention is concerned with how priorities are determined for the circuit or packet preemptions.

The present invention determines the priority of a network connection so that the priority can be responsive to the connection's actual downtime, allowed downtime, and even its expected downtime. The actual downtime is the actual amount of outage which has occurred during the predetermined period of time up to a time T. The allowed downtime is the permitted amount of outage of the connection over a predetermined period of time, typically a year. This is set forth in the SLA (Service Level Agreement) between the connection user and the SP (Service Provider) of the connection. The expected downtime is the amount of outage expected from the time T to the end of the predetermined period of time. Priority can be determined in many ways and the following exemplary descriptions illustrate how priority can be varied. The varying priorities of the connections are then used for re-establishing the connections upon a network failure.

Mesh Network Operation

Figure 2:
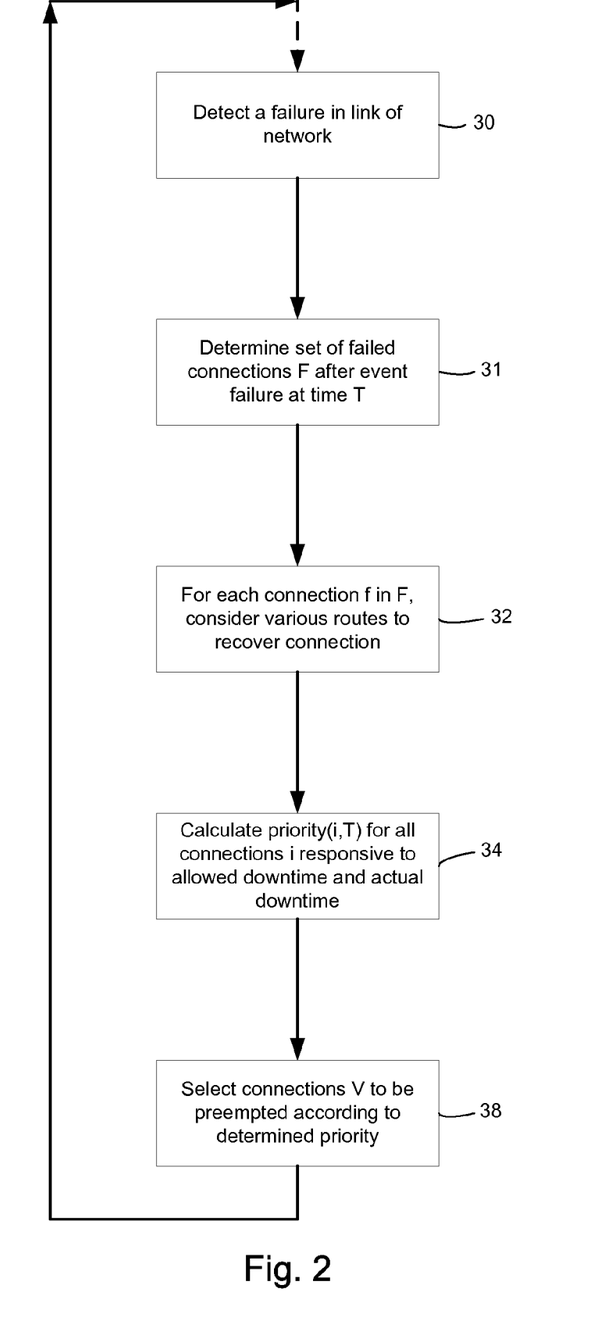
FIG. 2 is a flow chart of mesh network operations according to one embodiment of the present invention.

According to one embodiment of the present invention, a method of network operation is illustrated by the flow chart of FIG. 2. During the operation of the network as indicated by the dotted arrow from the top of the drawing, step 30 detects the failure of a link in the network. Such detection is dependent upon the particular communications network protocol and is well established and known to network designers. For example, the long-established SONET/SDH protocol provides link failure detection in many optical networks.

Given the failure event, step 31 determines the set of network connections F which are directly impacted by the failure at time T. Time T is defined from the start of the SLA period, say, for example, the beginning of each calendar year, for the connections. For each connection f in set F, step 32 considers various alternate routes unaffected by the failure to recover that connection. At time T these alternate routes typically carry other network connections and might have available or free bandwidth, i.e., unused capacity, to carry more connections. To recover or protect the network connection f, by using an alternate route, the available bandwidth may be used, or other connections may be preempted or "bumped off" the alternate routes.

In accordance with one embodiment of the present invention, step 34 calculates the priorities of the network connections i at time T. Priority can be defined in many different ways and the following is a simple example:

$$\text{Priority}(i,T)=1 \text{ if ActualDown}(i,T)>\text{SLA}(i); \text{ or}$$

$$\text{Priority}(i,T)=0 \text{ otherwise;}$$

where SLA(i) is the maximum allowed outage, or downtime, according to the SLA, and ActualDown(i,T) is the actual amount of downtime that the connection i has experienced from the beginning of the SLA period. The connections i in the set I include not only the connections f in the failed set F, but also the connections which already occupy the alternate routes. Such prioritization preempts users who have not yet exhausted their allowable outage time, SLA(i), without regard to how close/far they are from violating their SLA. This priority determination is very simple, but it is still much better than the current situation of fixed priorities.

Of course, other variable prioritizations are possible. For example, a function Slack(i, T) can be defined which measures the amount of tolerance a connection i has for an outage at time T under the network connection's SLA. Slack is used to determine priority responsive to the allowed downtime, the actual downtime and even the expected downtime of the connection. For example:

$$\text{Slack}(i,T)=\text{SLA}(i)-\text{ActualDown}(i,T)-(1-T)\cdot\text{ExpectedDown}(i)$$

where ExpectedDown(i) is the expected downtime for the entire SLA period for the connection I and the likely downtime through the remainder of the year is $(1-T)\cdot\text{ExpectedDown}(i,T)$. In this example, priority is also responsive to the expected downtime, in addition to the allowed downtime and the actual downtime. Priority might then be set as:

$$\text{Priority}(i,T)=\text{MaxPriority}-\text{Slack}(i,T)$$

where MaxPriority is the highest priority which a connection can receive.

Returning to the FIG. 2 flow chart, step 34 thus determines the priorities of all the connections F. The preempting network connections and the set of victims V, the set of preempted network connections, are selected by step 38. First, priority is used for the network connections f to first consume the available free bandwidth and then to preempt the previously occupied alternate routes. The preempted network connections fall into set V. The process flow then awaits the next link failure. Even if the network chooses to preempt a connection and the downtime is extensive enough to risk a violation of the connection's SLA, the preempted connection may be reconsidered at the next failure event based on its new higher priority and a different connection may be preempted.

Ring Network Operation

Figure 3:
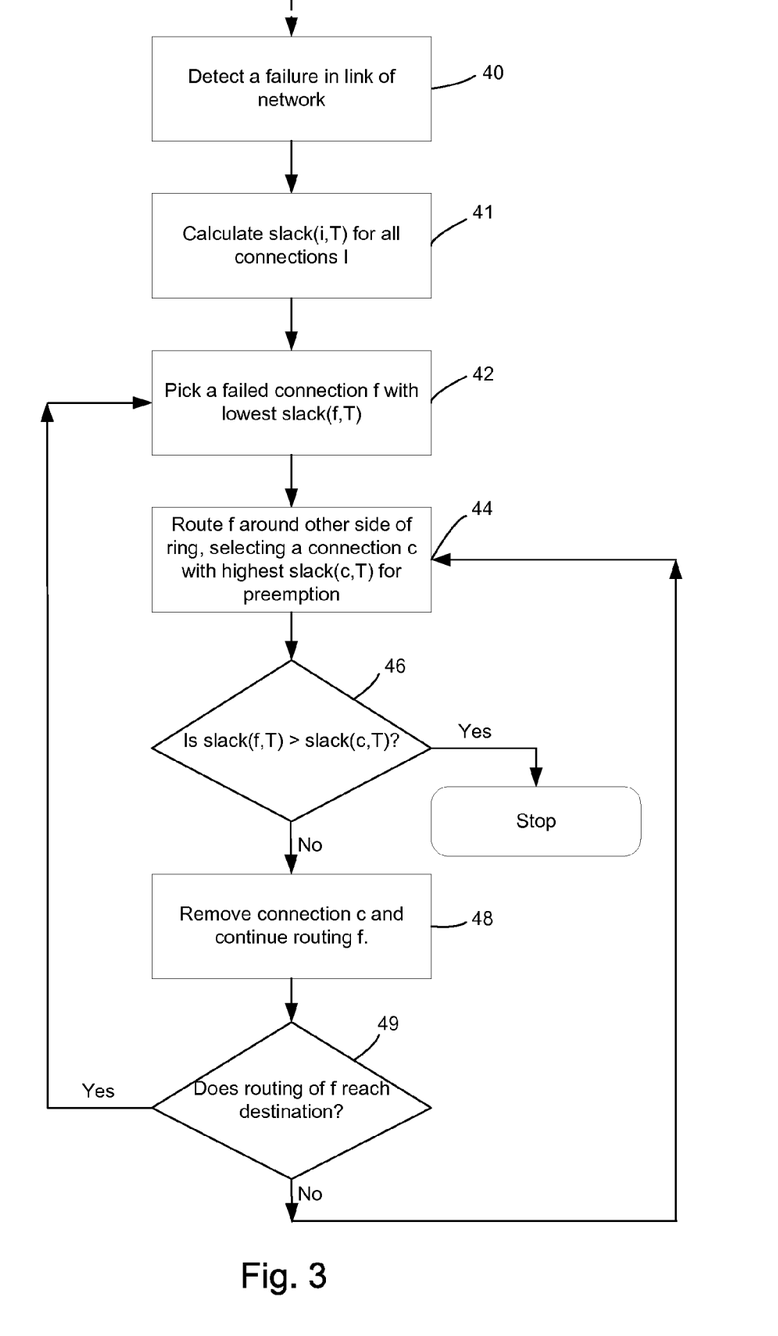
FIG. 3 is a flow chart of ring network operations according to another embodiment of the present invention.

The present invention is adaptable to ring networks. In a ring network the operation according to the present invention is simpler since alternate routing is trivial compared to a mesh network. Nonetheless, determination of an optimal V, the set of connections which are to be preempted, is still difficult. The exemplary flow chart of FIG. 3 shows the operations according to one embodiment of the present invention.

Step 40 detects the failure of a link in the ring network during the normal operation of the network as indicated by the dotted arrow from the top of the drawing. As stated previously, failure detection is dependent upon the particular communications network protocol and is well established and known to network designers. Step 41 calculates the slack(i,T) defined above for all connections, including the network connections which failed and the alternate route connections, typically the network connections in the opposite direction around the ring network from the failed connections. In step 42 a failed network connection f with lowest slack(f,T) is selected, and by step 44 the connection f is alternately routed around the other side of the ring network. Any network connection c with the highest slack(c,T) is selected for preemption.

Decision step 46 tests whether if slack(f,T)>slack(c,T). If the statement is true, the process is stopped. If the statement is false, then the alternate routing of the failed connection f is completed in step 48 by preempting all, or parts of, the network connection c. If parts of connection c, i.e., links for connection c, are not used by connection f, they are marked as free bandwidth (to be used by subsequent connections).

Step 49 tests whether the alternate routing of the network connection f reaches its intended destination, i.e., whether the alternate routing for connection f is completed. If the connection is completed, the process returns to step 42 wherein another failed connection f with the lowest slack(f,T) is selected. If the connection is not completed, the process moves to step 44 to continue the alternate routing of connection f with the preemption of additional network connections c.

Even though the flow chart above describes a single failure event on a ring network, the present invention returns the process flow for future failure events as in the case for mesh networks above.

Network Operations in General

The descriptions above with respect to the FIGS. 2 and 3 networks refer to the operations of the entire network. The priority determining operations might be specifically performed by the nodes of the network, a network management station, or a network billing system. If the priority determinations are performed by the network nodes, the node which detects the link failure in a mesh network performs the priority determinations for its network connections or priority may also be determined by the node originating the failed network connection in the failed link. In the latter case, the node detecting the failure must, of course, relay this information to all nodes affected by the failure.

Rather than the network nodes, a network management station may determine the network connection priorities. Any tracking information of downtime per network connection through the SLA period, which allows an SP to prove an SLA has been met, is most likely to reside in the network management station, rather than at the network node level where the connection preemptions are performed. Therefore it may be easier to have the network management station determine the network connection priorities.

Figure 4:
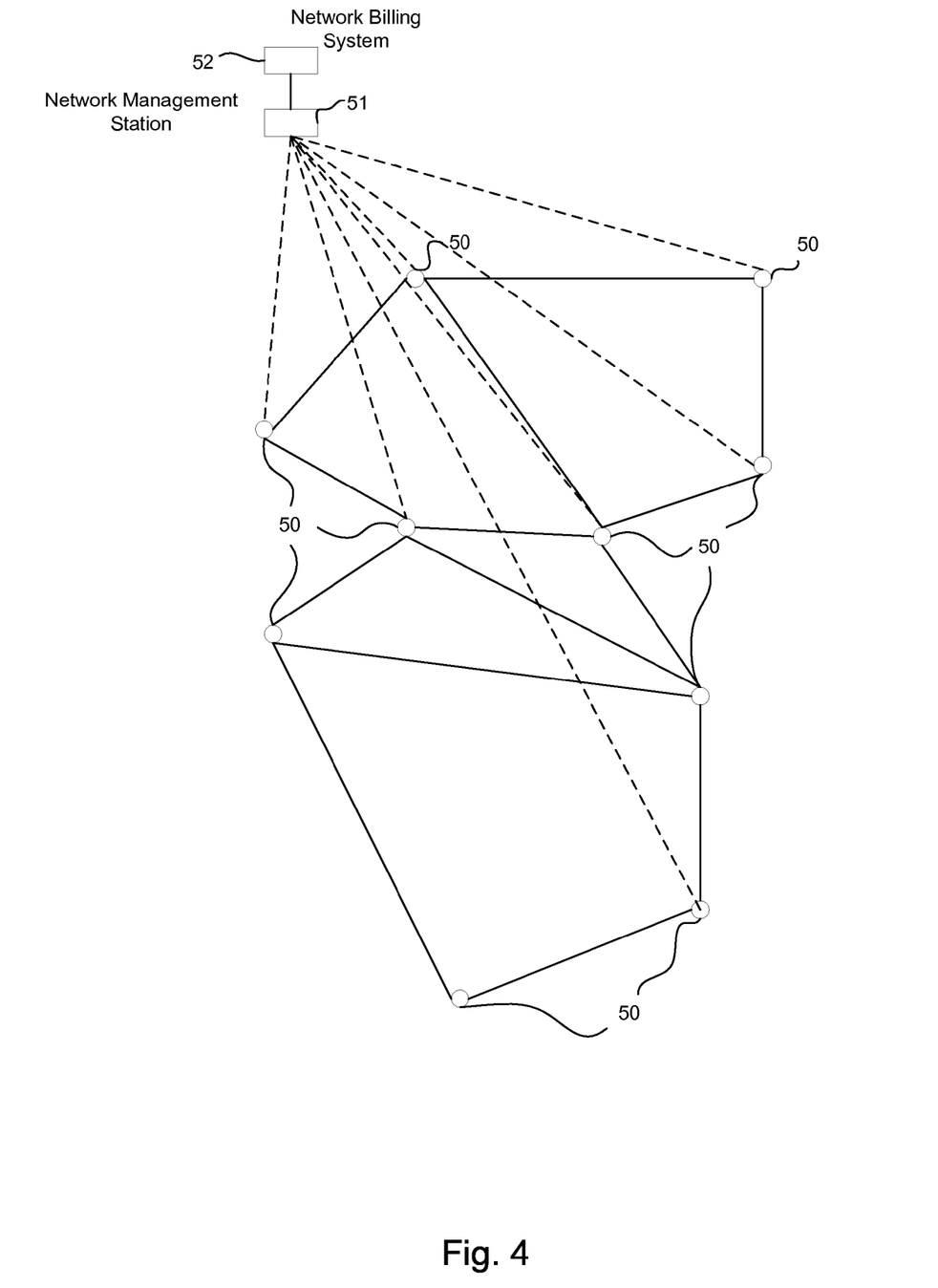
FIG. 4 illustrates a communications network with a network management station and a network billing system.

FIG. 4 illustrates an exemplary mesh network with nodes 50 and a network management station 51 which supervises the operation of the network by communicating directly to each of the nodes 50, as shown by the dotted lines. For nodes which are not connected directly to the station 51, network management is performed through the network links by an optical service channel. The network management station 51 tracks the network failures and measures the actual downtime for each connection. In operation, the network management station provisions the network nodes with the priorities of each of the network connections and then periodically updates the network nodes 50 with new priority values in response to the failures which have occurred in the intervening period. As stated previously, the network management station 51 determines the priority of each network connection responsive to the connection's actual downtime and allowed downtime from the connection's SLA and actual downtime. Even the connection's expected downtime might also be used. The new priority values prepare the nodes for the next failure. Alternatively, the network management station 51 can re-provision the nodes after each failure.

A network billing system 52 might also be used to determine the priorities of the network connections. Since a service provider charges the users of the network, the network operates with a network billing system installed within, or as shown in FIG. 3 connected to, the network management station 51. The network billing system 52 keeps track of the each connection, including its allowed downtime in accordance with its SLA and its actual downtime, to be able to justify the bills to the users. Information for determining connection priority is thus readily available to make priority determinations and communication to the nodes 50 is through the network management station 51.

The network nodes, network management station or network billing system are adapted to determine the connection priorities. One or more integrated circuits, such as an ASIC (Application Specific Integrated Circuit) or an FPGA (Field Programmable Gate Array), can be used in the nodes, station or system to carry out these determination operations. This implementation in hardware allows for high speed operations.

Figure 5:
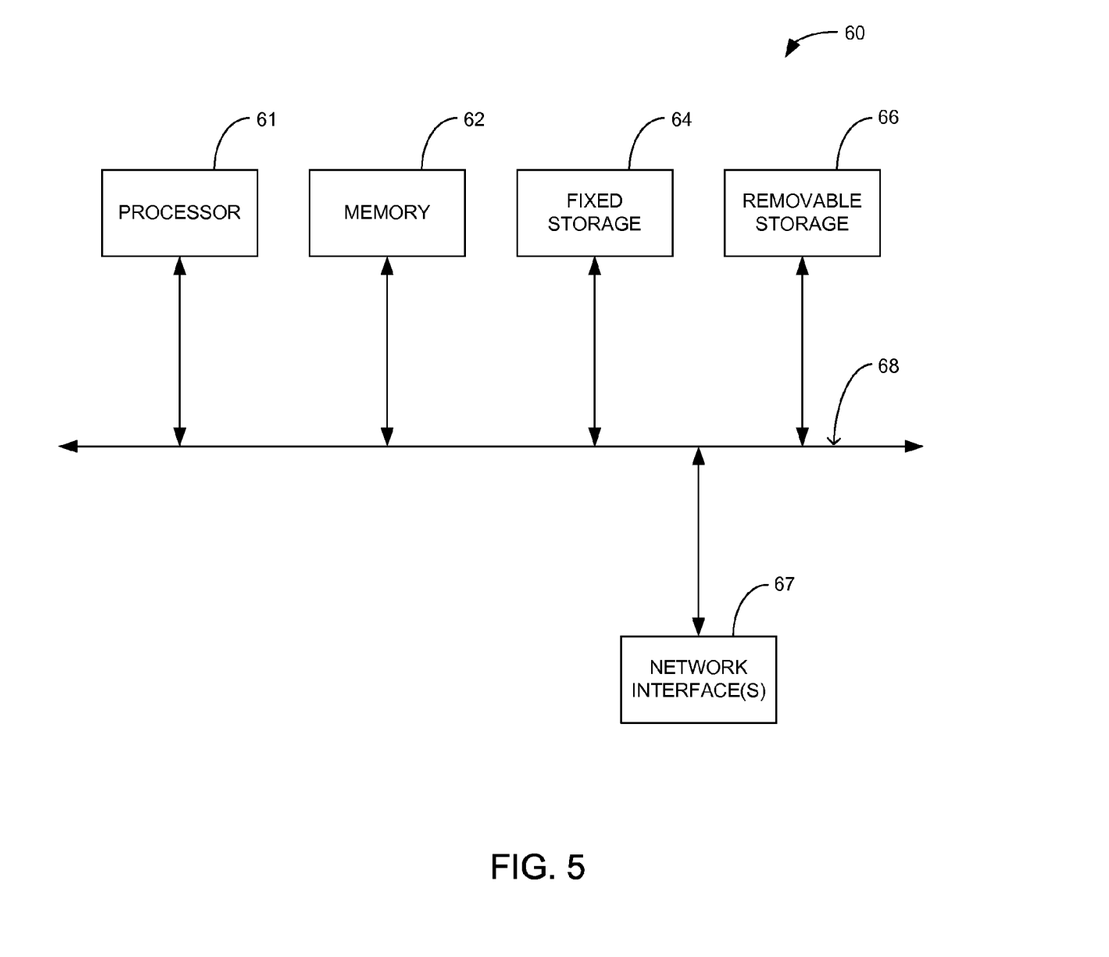
FIG. 5 represents one organization of a network node, a network management station or a network billing system, according to an embodiment of the present invention.

On the other hand, the present invention might be implemented in more conventional arrangements of integrated circuits. Firmware, such as the ROM (Read-Only Memory) of a microcontroller, or software can be used with these arrangements and offer certain advantages. For instance, a processor unit instructed by the software might also perform operations. FIG. 5 shows a block diagram of a representative computer system 60 that may be used to execute the software of an embodiment of the invention. The computer system 60 includes memory 62 which can store and retrieve software programs incorporating computer code that implements aspects of the invention, data for use with the invention, and the like. Exemplary computer readable storage media include CD-ROM, floppy disk, tape, flash memory, semiconductor system memory, and hard drive. The computer system 60 further includes subsystems such as a central processor 61, fixed storage 64 (e.g., hard drive), removable storage 66 (e.g., CD-ROM drive), and one or more network interfaces 67, all connected by a system bus 68. Additional or fewer subsystems may be used. For example, computer system 60 may include more than one processor 61 (i.e., a multi-processor system) or a cache memory.

Further Embodiments of the Present Invention

There are many ways of determining priority in accordance with the present invention. If the network connections are not operating under SLAs, only the actual downtime of a network connection is used to determine the priority of the connection at a link failure. This allows the downtime caused by the failure to be shared among the network connections in prescribed and orderly manner.

As a further example of priority determination according to the present invention, the definition above for Slack assumes that there is some data on the reliability of an end-to-end path, i.e., the expected downtime of a connection for the year. In case such information is not known, one way of accounting for the lack of information to simply assume that the expected downtime for the year is the allowed downtime for the year. This represents a more conservative approach that ensures a connection is on track to meet its SLA irrespective of how much its path is likely to fail.

Another embodiment of the present invention determines the priority of a network connection based upon its permitted downtime from its SLA and the connection's link failures themselves. Instead of tracking the history of outages for a connection over an extended period of time (e.g., a year) and determining the connection's priority based upon the tracked downtime, the priority of a connection simply decays exponentially in time if the connection does not experience failures and rises upon failure. This permits a variable priority without the requirement of extensive memory to track the downtimes experienced by the connections.

In the descriptions above it was assumed that the SLA is defined in terms of downtime per year. A single significant outage might allow the priorities of the connections to be set and still meet the terms of the SLAs. In contrast, the expectations of the customers might not be met due to the long interruption of services. Accordingly, the Slack of each connection might be recalculated during the outage period so that if a connection that was not recovered based on its initial priority is now close to violating its SLA, its priority will be reconsidered. Alternatively, an SLA can be defined with two time periods: (1) the total permitted outage during a year, and (2) the maximum contiguous permitted outage. In such a case, the Slack function accounts for both time frames in the determination of a connection's priority. This guarantees that the downtime of a failure is limited and the outage period for a connection is not excessive.

Finally, since at least one embodiment of the present invention operates to preempt connections with maximum Slack, it may be desirable to reroute connections based on knowledge of Slack in the network. This requires changes to the topology dissemination protocols, such as OSPF (Open Shortest Path First), of the network. There are two possible approaches without incorporating per connection data in the disseminated information. For networks which operate with predefined backup paths, such as MPLS (Multiprotocol Label Switching) FRR (Fast Rerouting) or SONET mesh protection, there is no need for real-time routing decisions, so there is no need to change OSPF. The same is true for ring networks. For other networks, it is sufficient to add failure statistics per link in the network, instead of adding per connection data. Since most failures are due to fiber cuts, this minimal information suffices to estimate the Slack for a particular route.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

The invention claimed is:

1. A method comprising:
   at a network device configured with processing logic, determining a priority for each of a plurality of network connections provisioned to communicate over a communications link based on a corresponding predetermined downtime;
   detecting a failure in the communications link at a point in time T;
   calculating an actual downtime for each of the plurality of network connections from an amount of outage which has occurred during a predetermined period of time up to the time T;
   calculating an allowed downtime for each of the plurality of network connections from a permitted amount of outage over the predetermined period of time;
   calculating an expected downtime for each of the plurality of network connections from an amount of outage expected from the time T to an end of the predetermined period of time;
   protecting the plurality of network connections from the failure in the communications link according to the determined priority for each of the network connections, wherein a network connection with a higher priority preempts a connection with a lower priority; and
   updating the priority for each of the plurality of network connections based on a time since calculating the actual downtime and the allowed downtime so as to increase the priority for each of the plurality of network connections as the actual downtime approaches the allowed downtime for each of the network connections.

2. The method of claim 1 wherein updating further comprises updating the priority for each of the plurality of network connections such that a number of network connections with the calculated actual downtime in excess of the calculated allowed downtime is minimized.

3. The method of claim 2, further comprising detecting a second failure within the predetermined period at a second point in time and updating the priority for each of the plurality of network connections based on a time since the second point in time and since calculating the allowed downtime such that the number of network connections with the calculated actual downtime in excess of the calculated expected downtime is minimized during the second failure.

4. The method of claim 1, further comprising computing a slack period representing a remaining allowed downtime for each of the network connections within the predetermined time period based on the calculated allowed downtime, the calculated actual downtime, and the calculated expected downtime for a remaining time period within said predetermined time period.

5. The method of claim 4 wherein updating comprises updating the priority of the network connections based on the slack period.

6. The method of claim 1, wherein updating comprises updating the priority for each of the network connections based on an accumulated actual downtime for a plurality of predetermined periods.

7. An apparatus comprising:
   a network interface configured to communicate over a network; and
   a processor configured to:
      determine a priority for each of a plurality of network connections to the network provisioned to communicate over a communications link based on a corresponding predetermined downtime;
      detect a failure in the communications link at a point in time T;
      calculate an actual downtime for each of the plurality of network connections from an amount of outage which has occurred during a predetermined period of time up to the time T;
      calculate an allowed downtime for each of the plurality of network connections from a permitted amount of outage over the predetermined period of time;
      calculate an expected downtime for each of the plurality of network connections from an amount of outage expected from the time T to an end of the predetermined period of time;
      protect the plurality of network connections from the failure in the communications link according to the determined priority for each of the network connections, wherein a network connection with a higher priority preempts a connection with a lower priority; and
      update the priority for each of the plurality of network connections based on a time since calculating the actual downtime and the allowed downtime so as to increase the priority for each of the plurality of network connections as the actual downtime approaches the allowed downtime for each of the network connections.

8. The apparatus of claim 7, wherein said processor is further configured to update the priority for each of the plurality of network connections such that a number of network connections with the calculated actual downtime in excess of the calculated allowed downtime is minimized.

9. The apparatus of claim 8, wherein said processor is configured to detect a second failure within the predetermined period at a second point in time and to update the priority of each of the network connections based on a time since the second point in time and since calculating the allowed downtime such that the number of network connections with the calculated actual downtime in excess of the calculated expected downtime is minimized during the second failure.

10. The apparatus of claim 7, wherein said processor is further configured to compute a slack period representing a remaining allowed downtime for each of the network connections within the predetermined time period based on the calculated allowed downtime, the calculated actual downtime, and the calculated expected downtime for a remaining time period within said predetermined time period.

11. The apparatus of claim 10, wherein the processor is further configured to update the priority of the network connections based on the slack period.

12. The apparatus of claim 7, wherein said processor is configured to update the priority for each of the network connections based on an accumulated actual downtime for a plurality of predetermined periods.

13. A computer readable memory storing instructions that, when executed by a processor, causes the processor to:
   determine a priority for each of a plurality of network connections provisioned to communicate over a communications link based on a corresponding predetermined downtime;
   detect a failure in the communications link at a point in time T;

calculate an actual downtime for each of the plurality of network connections from an amount of outage which has occurred during a predetermined period of time up to the time T;

calculate an allowed downtime for each of the plurality of network connections from a permitted amount of outage over the predetermined period of time;

calculated an expected downtime for each of the plurality of network connections from an amount of outage expected from time T to an end of the predetermined period of time;

protect the plurality of network connections from the failure in the communications link according to the determined priority for each of the network connections, wherein a network connection with a higher priority preempts a connection with a lower priority; and update the priority for each of the plurality of network connections based on a time since calculating the actual downtime and the allowed downtime so as to increase the priority for each of the plurality of network connections as the actual downtime approaches the allowed downtime for each of the network connections.

14. The computer readable memory of claim 13, wherein the instructions that cause the processor to update comprise instructions that cause the processor to update the priority for each of the plurality of network connections such that a number of network connections with the calculated actual downtime in excess of the calculated allowed downtime is minimized.

15. The computer readable memory of claim 14, further comprising instructions that cause the processor to detect a second failure within the predetermined period at a second point in time and to update the priority of each of the network connections based on a time since the second point in time and since calculating the allowed downtimes such that the number of network connections with the calculated actual downtime in excess of the calculated expected downtime is minimized during the second failure.

16. The computer readable memory of claim 13, further comprising instructions that cause the processor to compute a slack period representing a remaining allowed downtime for each of the network connections within the predetermined time period based on the calculated allowed downtime, the calculated actual downtime, and the calculated expected downtime for a remaining time period within the predetermined time period.

17. The computer readable memory of claim 16 further comprising instructions that cause the processor to update the priority of the network connections based on the slack period.

18. The computer readable memory of claim 13, wherein the instructions that cause the processor to update comprise instructions that cause the processor to update the priority for each of the network connections based on an accumulated actual downtime for a plurality of predetermined periods.

\* \* \* \* \*